Patented Jan. 8, 1952

2,581,605

UNITED STATES PATENT OFFICE 2,581,605

ARCH SUPPORT AND METHOD OF MAKING SAME

William M. Scholl, Chicago, Ill.

Application October 25, 1946, Serial No. 705,535

8 Claims. (Cl. 36—71)

The improvements relate primarily to arch supports designed to support the arches of human feet and to correct abnormalities thereof, but may be applied to other purposes to which they may be adaptable.

Their objects are, among others, to produce a composite metal, plastic and fabric support which conforms approximately to the under side of the instep and metatarsal arches and heel portion of the foot, possesses a relatively high degree of flexibility throughout its area, is strong and durable, light in weight and moisture proof and can be adjusted within ordinary limits to variations of the foot, and can be made at a minimum cost for materials, labor and overhead.

Other objects and advantages will appear to those skilled in the art from the following description and the drawings referred to therein.

Figure 2:
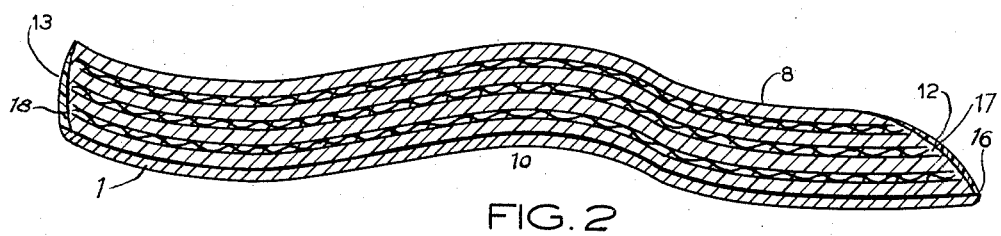
Fig. 2 is a vertical longitudinal section substantially on the line 2—2 of Fig. 1.
Figure 3:
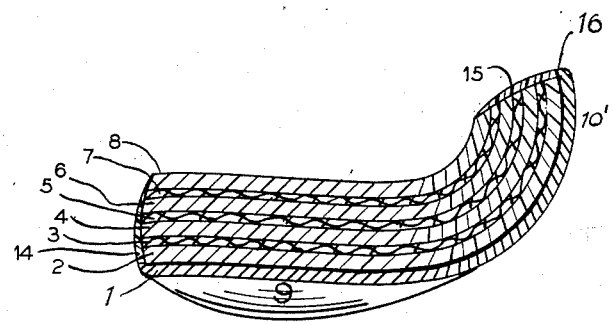
Fig. 3 is a vertical cross section substantially on the line 3—3 of Fig. 1 looking toward the heel portion.

In Figs. 2 and 3 of the said drawings, the laminae or layers of the support have been enlarged in thickness to better illustrate them, but in a suport of the size and number of laminae illustrated the said total thickness of the combined laminae, including the metal base, is preferably about $\frac{1}{8}$ inch, the greater part of which is made up by the plastic layers.

The bottom layer or base 1 of the laminated support consists of a thin sheet of hardened aluminum or of an aluminum alloy such as duralumin and to the upper surface of this metal base is secured the bottom layer of plastic 2 by a resinous cement applied to the abutting surfaces of both layers before the heat and pressure hereinafter referred to are applied.

The four laminae 2, 4, 6 and 8 are preferably composed of phenolic resin of the well known phenol formaldehyde type but sheets of "nitrocellulose" stock or other plastic having a relatively low fusing point may be used.

Between the plastic laminae and united therewith are interposed layers of fabric 3, 5 and 7 which may be of cotton print cloth, having about an 80 mesh to obtain very satisfactory results, or a felted sheet of long fibre wood pulp produced by a well known pulp suction process and dried and pressed so as to have tensile strength comparable to the cloth. These fibrous sheets are much inferior in thickness to and are united with the plastic by dipping and redipping them in a bath of the plastic material dissolved in a solution of highly volatile hydrocarbon such as alcohol; or sheets of the fabric and plastic may be superposed in alternate layers on one another and then united in the flat by the application of pressure and heat, sufficient to render the plastic fluent and cause it to permeate the meshes and fibres of the fabric, then cooled. In either case, the plastic is inseparably joined with the fabric and a composite laminated sheet formed with the plastic laminae forming the top and bottom layer thereof, and the plastic layers which originally form a coating covering the fabric layers united to form in effect a simple plastic lamina between the fabric layers. It will be understood that the number of layers may be varied to suit various needs and purposes and vary the strength and resiliency of the composite sheet. The fabric and plastic layers should be alternated, however, with the plastic at top and bottom so as to substantially envelop the fabric. The laminae should also be coextensive with one another and with the metallic base sheet when united, and it has been my practice to unite them all in the form of a large sheet then cut the sheet by means of cutting dies or a jig-saw to form therefrom many blanks of the proper size and shape to be pressed into individual arch supports with the desired vertical contours.

It is also feasible to unite the fabric and plastic sheet with the metallic base sheet in the operation just described of uniting the non-metallic layers and in the flat by placing the non-metallic laminae on the said metallic base sheet with the cement in between the bottom plastic laminae and the metal. In fact, by the use of suitable dies and forms, all the laminae can be united and shaped to form the final support in a single operation by heat and pressure after they have been cut out separately, and this is the preferred method in some cases.

The metal, plastic and fabric laminae—whether previously united or not—are then placed in a heated forming die with complemental male-female upper and lower members and between such members and pressed into the desired contour, as shown in the drawings, so that they will conform approximately to the under side of the human foot to which they are to be applied. In this operation relatively low temperatures are used, so that the metal is not affected by such temperatures, but sufficiently high to soften and make somewhat fluent the phenolic resin or other plastic and then cause it to unite intimately with the fabric and metal. Temperatures varying from 180° to 312° are effective for this purpose, depending upon the type of plastic material, and the pressure employed must be determined by this factor and by the character, gauge and temper of the metal which must be permanently formed in the proper contours including the slight depressions 9 and 11, the middle rise 10 and the upturned side 10'. The pressure is not maintained and the support is held in the dies only a sufficient time for the plastic to soften and assume the form given it by the said dies, in which it will be held by the metal base plate or lamina 1 while it is cooled in normal atmospheric temperature and set.

Figure 1:
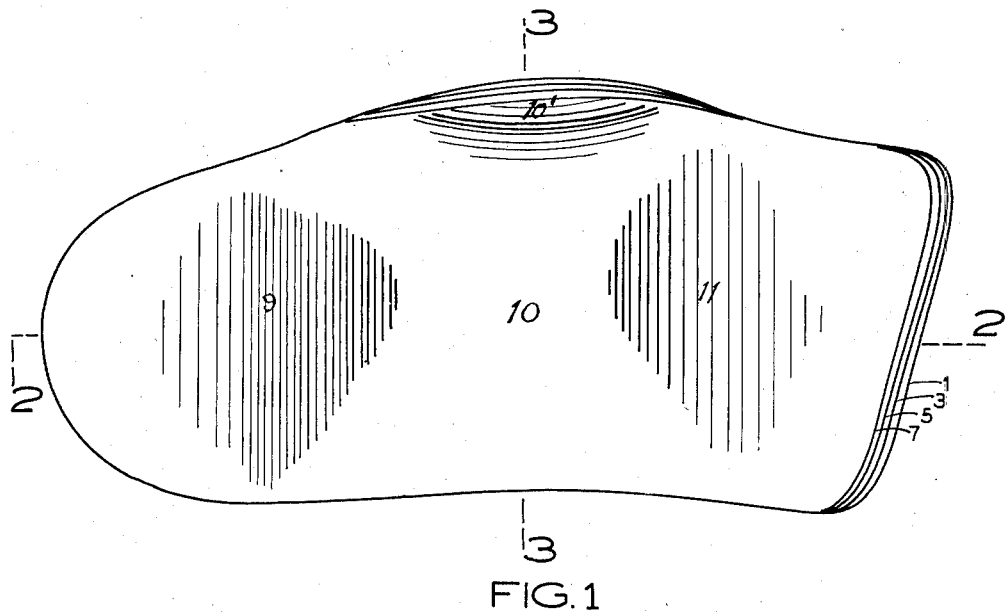
Fig. 1 is a top plan view of a support embodying the structural improvements and made in accordance with the improved method.

In this pressing and forming operation, the plastic layers will take substantially the draw of the metal and will extend slightly beyond and overlap the fabric due to their softness and the pressure thereon, so that they will protrude slightly beyond and over the edges of the fabric layers, unite with one another and seal the said edges, its action being indicated in Fig. 1, in which the plastic, which in this case is colorless and transparent, is not shown. Added plastic may, however, be supplied in liquid or semi-solid form, as indicated at 12, 13, 14 and 15, before the heating and pressing operation, to supplement the protruding joined edges of the plastic layers and make them thicker so that they can be ground down to make the edges of the support smooth and tapering. This is their state in the illustrated support of the drawing; and the portions 12 to 15 are substantially of the form, thickness and contour of the joined protruding edges, if so designed.

After the molding and die forming operation is finished and the support has been permitted to cool until the plastic has set the edges of the metal base layer are ground until all roughness and sharp edges are removed and they are smooth and slightly tapered. In this operation the edges of the plastic are also made smooth and tapered if necessary. However, the tendency of the plastic to follow the draw of the metal will produce a bevel or taper, particularly at the forward end where the draw is greatest. In order to produce this and to prevent the plastic from extending beyond the metal the plastic and fabric sheet are cut slightly shorter than the metal which produces the effect indicated at 17 and 18 where the plastic extends over the ends of the fabric and seals up the latter. The extra plastic indicated at 12 to 15 may also be added if desired or found necessary to allow for sufficient grinding off and tapering of the non-metallic layers.

It will be seen that in the manner herein set forth, a laminated arch support or similar article composed of metal, plastic and fabric laminae is produced, and one which can be produced in substantially one operation; that the fabric layers are encased and sealed in the plastic, so that they are not exposed even at their edges to the destructive action of moisture from foot perspiration or from sources outside the shoe of the wearer, which would cause rapid deterioration of the support. The metal base plate not only holds the other laminae in the form in which they have been molded preventing coldflow and distortion, crystallization and cracking under the pressure and flexures of use, but acts as a wear-plate to prevent the support from wearing thin at its ends, particularly its forward end, cracking and losing its efficiency. It also prevents over-flexing of the support and the letting down of the supported arch resulting therefrom. At the same time it permits the support to be adjusted, by means of the well known arch support adjusters or otherwise, to fit it to the particular instep arch on which it is to be worn, within ordinary limits, and to maintain such adjustments. There are also other advantages which will be apparent to those familiar with supports of this character. The plastic and fabric laminae also support the metal base layer and permit it to be made of light guage material. They further provide a very smooth polished upper surface, which greatly reduces friction, and beveled edges at front and upturned side edges which will prevent abrasion of the foot and socks of the wearer, as well as having other well recognized advantages.

The method herein described partakes of the nature of a metal drawing and a die casting operation, in which the metal is drawn and shaped by the pressure and the plastic is simultaneously molded and drawn by the combined heat and pressure, while at the same time the fabric acts to hold the plastic united therewith against excess flowing movement and holds it in proper position. It also has a stiffening effect on the plastic after it is set and while the composite support is in use, and retards cracking.

In fitting or adjusting the composite support, when necessary, to the foot of the wearer, it can first be heated to soften the plastic, as by placing it in a bath of hot water or oil, in which the fabric will be protected by the sealed edges or subjecting it to the heat of an electric resistance or infra-red heater, and then adjusted to accommodate it to the wearer's foot in the usual arch support adjuster or fitter for metal arch supports, comprising a holder and hand operated press, to be found in most shoe stores or other stores in which arch supports are sold.

What I claim is:

1. A method of fabricating arch supports and the like, comprising the steps of superposing on a hard resilient metal bottom lamina in substantially parallel relation therewith and with each other preformed laminae of plastic and of fibrous material substantially coextensive therewith arranged in alternated relation with plastic laminae at bottom and top and the other lamina interposed between, then applying to the said assembled metal and non-metal laminae a male-female die and mold having the shape and contour internally of the support to be produced heated to a temperature sufficient to cause the plastic to soften and become fluent but not liquid under pressure but insufficient to fuse or impair the hardness of the metal, then applying pressure to the die members sufficient to draw and thus drawing and shaping the metal lamina to conform thereto while conforming the non-metallic laminae to the metallic lamina and maintaining said heat for a period sufficient to permanently unite all the laminae to form a complete composite laminated metal and plastic support.

2. A method of fabricating arch supports and the like, comprising the steps of superposing on a hard resilient metal bottom lamina in substantially parallel relation therewith and with each other preformed laminae of plastic and fabric substantially coextensive therewith arranged in alternated relation with plastic laminae at bottom and top and fabric lamina or laminae interposed between, then applying to the said assembled metal and non-metal laminae a male-female die and mold having the shape and contour internally of the support to be produced, heating all of said laminae to a temperature sufficient to cause the plastic to soften and become fluent but not liquid under pressure but insufficient to fuse or impair the hardness of the metal, then applying pressure to the die members sufficient to draw and thus drawing and shaping the metal lamina to conform thereto while conforming the non-metallic laminae to the metallic lamina and maintaining said heat for a period sufficient to permanently unite all the laminae to form a complete composite laminated metal, plastic and embedded fabric support.

3. A method of fabricating arch supports and the like, comprising the steps of superposing in on a hard resilient metal bottom lamina in substantially parallel relation therewith and with each other preformed laminae of plastic and fabric substantially coextensive therewith arranged in alternated relation with plastic laminae at bottom and top and fabric laminae interposed between, all of said laminae being planiform and inserting a layer of resinous cement between said bottom plastic lamina and metal lamina covering the abutting surfaces of both, then applying to the said assembled metal and non-metal laminae a male-female die and mold having the shape and contour internally of the support to be produced heated to a temperature sufficient to cause the plastic to soften and become fluent and penetrate the fabric but not liquid under pressure but insufficient to fuse or impair the hardness of the metal, then applying pressure to the die members sufficient to draw and thus drawing and shaping the metal lamina to conform thereto while conforming the non-metallic laminae to the metallic lamina and permanently unite all the laminae to form a complete composite laminated metal, plastic and embedded fabric support.

4. A method of fabricating arch supports and the like, comprising the steps of superposing on a hard resilient metal bottom lamina in substantially parallel relation therewith and with each other preformed laminae of plastic and farbic substantially coextensive therewith arranged in alternated relation and united with plastic laminae at bottom and top and fabric laminae interposed between, then applying a heat activated cement between the metal and bottom non-metal laminae, applying to the said assembled metal and non-metal laminae a male-female die and mold having the shape and contour internally of the support to be produced heated to a temperature sufficient to cause the plastic to soften and become fluent but not liquid under pressure but insufficient to fuse or impair the hardness of the metal, then applying pressure to the die members sufficient to draw and thus drawing and shaping the metal lamina to conform thereto while conforming the non-metallic laminae to the metallic lamina and maintaining said heat for a period sufficient to permanently unite the metal and next non-metal lamina to form a complete composite laminated metal, plastic and embedded fabric support.

5. A method of fabricating arch supports and the like consisting essentially of a thin resilient hard metallic bottom layer and alternated layers of plastic and fabric all united by fusion of the plastic and shaped to conform to the arch of the foot, comprising the steps of superposing on the hard resilient metal bottom lamina in substantially parallel relation therewith and with each other preformed laminae of the plastic and fabric substantially coextensive therewith arranged in alternated relation with plastic laminae at bottom and top and fabric laminae interposed between, then applying to the said assembled metal and non-metal laminae a male-female die and mold having the shape and contour internally of the support to be produced and extending over said edges said die heated to a temperature sufficient to cause the plastic to soften and become fluent but not liquid under pressure but insufficient to fuse or impair the hardness of the metal, then applying pressure to the die members sufficient to draw and thus drawing and shaping the metal lamina to conform thereto while conforming the non-metallic lamina to the metallic laminae and maintaining said heat for a period sufficient to permanently unite all the laminae edge covering material to form a complete composite laminated metal, plastic and embedded fabric support with edges sealing in the edges of the fabric.

6. A method of fabricating arch supports and the like, comprising the steps of superposing on a hard resilient metal bottom lamina in substantially parallel relation therewith and with each other preformed laminae of plastic and fabric substantially coextensive therewith but slightly short of at least the forward edge of the metal arranged in alternated relation with plastic laminae at bottom and top and fabric laminae interposed between, then applying to the said assembled metal and non-metal laminae a male-female die and mold having the shape and contour internally of the support to be produced heated to a temperature sufficient to cause the plastic to soften and become fluent but not liquid under pressure but insufficient to fuse or impair the hardness of the metal, then applying pressure to the die members sufficient to draw and thus drawing and shaping the metal lamina to conform thereto while conforming the non-metallic laminae to the metallic lamina causing the said plastic laminae to exude, extend beyond the fabric laminae and unite to cover and seal in at least said forward edges thereof and permanently unite all the laminae to form a complete composite laminated metal, plastic and embedded fabric support with at least the forward edges of the fabric laminae sealed in.

7. In a device of the character described, a bottom non-planiform lamina of hard resilient metal, non-metallic laminae superposed thereon and substantially coextensive therewith and conformed thereto consisting of plastic laminae at top and bottom and fabric laminae between them and united therewith by fusion and penetration of the plastic into the fabric, said non-metallic laminae being united with the metallic lamina by a union between the under surface of the bottom layer of the plastic lamina and the upper surface of the metallic lamina, the forward edges of the non-metallic laminae terminating slightly short of the next lamina below it and forming an inward and upward bevel.

8. A laminated support composed of a bottom lamina of sheet metal shaped to conform to the arch of the foot and laminae of a plastic such as phenolic resin and with interposed fabric superposed on the metal lamina, united and substantially coextensive therewith and having the same contour, the plastic laminae having their edges extending beyond those of the fabric and united and forming in effect a closed moisture-proof sheath enclosing the fabric.

WILLIAM M. SCHOLL.

REFERENCES CITED

The following references are of record in the file of this patent:

UNITED STATES PATENTS

| Number | Name | Date |
| --- | --- | --- |
| 180,819 | Ames | Aug. 8, 1876 |
| 1,301,579 | Lewis | Apr. 22, 1919 |
| 1,352,737 | Egerton | Sept. 14, 1920 |
| 1,370,799 | Egerton | Mar. 8, 1921 |
| 1,392,201 | Nearon | Sept. 27, 1921 |
| 1,890,910 | Marshall | Dec. 13, 1932 |
| 1,932,591 | Churchill | Nov. 7, 1933 |
| 2,077,125 | Miller et al. | Apr. 3, 1937 |
| 2,120,107 | Mathey | June 7, 1938 |
| 2,289,823 | Bradshaw | July 14, 1942 |
| 2,401,514 | Scholl | June 4, 1946 |
| 2,417,852 | Zerkle | Mar. 25, 1947 |

FOREIGN PATENTS

| Number | Country | Date |
| --- | --- | --- |
| 425,232 | Germany | Feb. 17, 1926 |